July 3, 1928.  1,675,620

L. M. SPENCER

THERMOSTATIC WATER VALVE

Filed May 21, 1927

Inventor
Louis M. Spencer
By Blackmore, Spencer & Hurd
Attorneys

Patented July 3, 1928.

1,675,620

UNITED STATES PATENT OFFICE.

LOUIS M. SPENCER, OF DETROIT, MICHIGAN, ASSIGNOR TO GENERAL MOTORS CORPORATION, OF DETROIT, MICHIGAN, A CORPORATION OF DELAWARE.

THERMOSTATIC WATER VALVE.

Application filed May 21, 1927. Serial No. 193,270.

This invention relates to a thermostatic control for a valve of the type used in the cooling system of an internal combustion engine for retarding the circulation of the cooling liquid until the engine becomes heated.

It is an object of this invention to provide a thermostatically controlled valve which will retard the flow of cooling liquid through the cooling system while the engine is cold and will gradually allow increased circulation as the temperature of the liquid in the cooling system rises. More specifically it is an object of this invention to provide an improved and simplified thermostatically controlled valve of this type, and one in which the valve is actuated by a helical spring of thermostatic material which is so arranged that it will gradually open the valve as the temperature rises. A further object is to provide a thermostatically controlled valve of this type which may be quickly and easily adjusted to vary the tension under which the valve is held closed.

Other objects and advantages of the invention will appear in the course of the following description, taken in connection with the accompanying drawing, and will be particularly pointed out in the appended claims.

Figure 1:
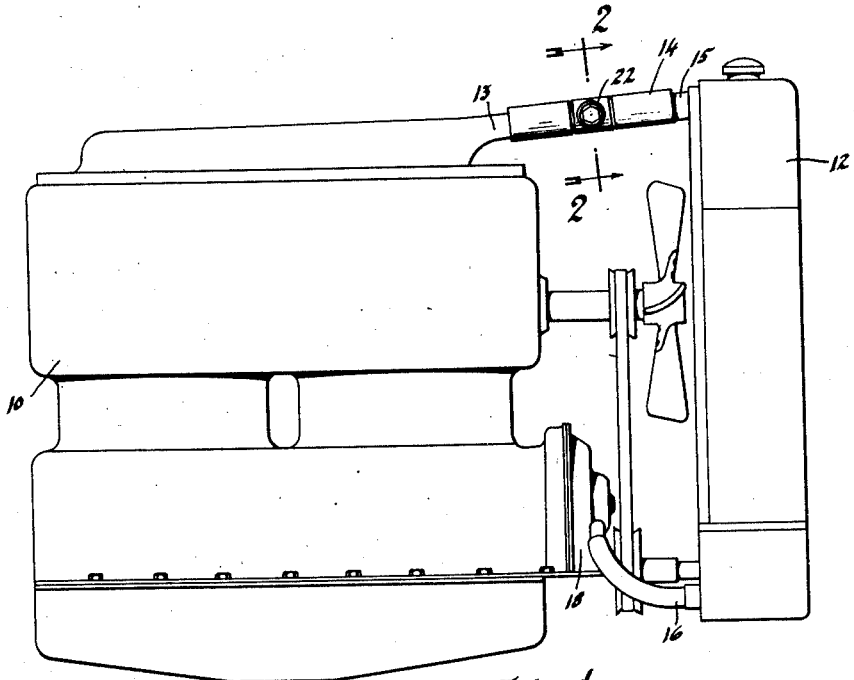
Figure 1 is a side elevation of a conventional engine and radiator showing the location of the thermostatically controlled valve.

Referring to the drawing, the numeral 10 indicates generally a conventional internal combustion engine and the numeral 12 the radiator. The radiator is connected with the water jacket of the engine by means of the upper flexible connection 14 and the lower flexible connection 16, the latter conducting the water through the pump 18, driven in the usual manner from the engine crank shaft. I have shown the thermostatic control device, indicated generally at 22, as located in the upper flexible connection 14, tho it is obvious that it may be located at other places, as in the outlet 13 from the engine water jacket or in the inlet 15 to the radiator.

Figures 2, 3:
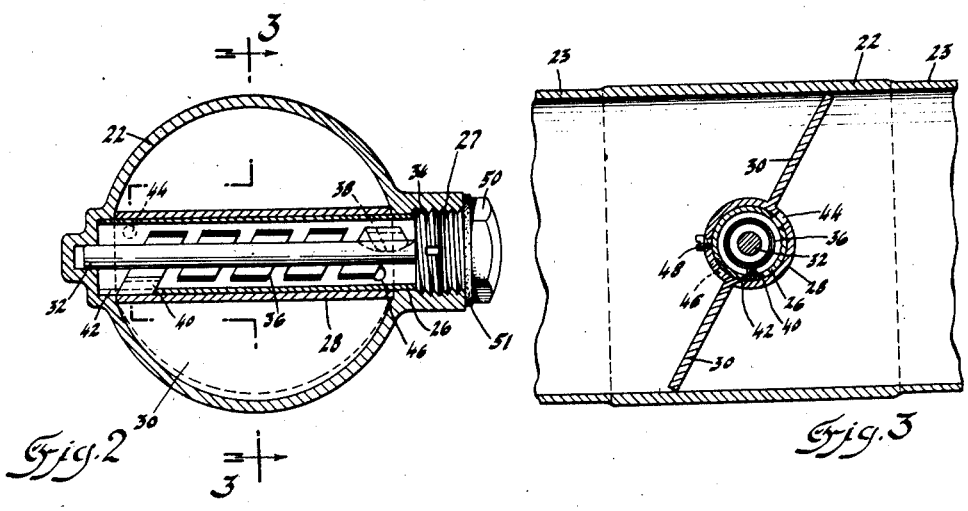
Figure 2 is a section along the line 2—2 of Figure 1.
Figure 3 is a section along the line 3—3 of Figure 2.

Referring to Figures 2 and 3, the device is shown as comprising a cylindrical casting or valve casing having bearing surfaces therein for the tubular bearing member 26, and being provided with a screw threaded opening 27 coaxial with the bearing surfaces. Fitting over the member 26 is the sleeve 28 which carries or is integral with the butterfly valve 30. Within the member 26 is the adjusting shaft or abutment 32 supported at one end in a bearing in the casting, as illustrated, and provided at its opposite end with a screw threaded head 34 having an ordinary groove as illustrated in Figure 2, so that it may be fixed in place by means of a screw driver. Surrounding the shaft 32 is the helical thermostat 36 which comprises inner and outer strips of metal having unequal coefficients of expansion. The thermostat is connected at one end to the shaft 32 by any ordinary means, as by welding or soldering or by means of a slot, as indicated at 38. At its opposite end the thermostat is provided with a bent out portion 40 which fits within a narrow slot 42 in the bearing member 26.

In order to provide for a small flow of cooling liquid through the device directly around the thermostat so that it will respond quickly to a change in temperature of the cooling liquid, I provide corresponding apertures in the sleeve 28 and tubular bearing 26, as indicated at 44 and 46. Ordinarily in assembling the device the shaft 32 carrying the thermostat is inserted in the bearing member 26 and the bent up portion 40 of the thermostat placed in the slot 42. The sleeve 28 carrying the butterfly valve is then placed in the position illustrated and even with the opening 27, and the bearing member 26 and thermostat slipped in through the threaded opening 27 and into the sleeve 28. The threaded head 34 is then screwed into place nearly as far as it will go, the bearing member 26 rotating freely with the thermostat. Within the device thus assembled, the valve 30 is pushed to closed position, the screw head 34 turned until the openings 44 and 46 in the bearing 26 and sleeve 28 coincide, and the set screw 48 in the sleeve 28 tightened to hold the members 26 and 28 against relative rotation. The headed screw or sealing plug 50 is then fixed in place. This plug 50 and associated washer 51 prevents leakage through the threaded openings; and the plug may also "jamb" the threaded head 34 and hold it against rotation. I thus mount the butterfly valve on what is substantially a tubular shaft which comprises bearing member 26 and sleeve 28, the valve and tubular shaft together comprising a pivoted valve member.

The flexible connection 14 is ordinarily a short section of rubber tubing or hose, normally slightly less in internal diameter than the outer portions 23 of the casting. The assembled device can thus be inserted in place between the two sections of the flexible connection 14 and will be held firmly in place. Additional fastening means in the form of circular clamps may be used if necessary. As indicated above, the exact means of fastening the device in place is immaterial as it may be fixed directly to the water jacket outlet or to the radiator inlet or it may be formed integral with either.

The operation of my device will now be described. Before the engine is started and while the cooling liquid in the tube 14 is still cold, the valve is in closed position, as illustrated in Figure 3. When the engine is started the position of this valve is such that circulation is almost but not entirely stopped, as some of the cooling fluid passes through the openings 44 and 46. In this connection, it should be noted that the opening 44 is at one end of the sleeve 28 and bearing 26 and on the side of the valve toward the engine while the opening 46 is at the opposite end of the sleeve and bearing member and on the side of the valve away from the engine. As there is only this slight amount of circulation, the cooling liquid in the jacket surrounding the engine heats rapidly. As the heated liquid passes in through the opening 44 and out through the opening 46, the thermostat of course becomes heated. As the thermostat is bimetallic, as described, the rise in temperature places it under a tension which causes it to turn the bearing member 26 and the sleeve and butterfly valve clockwise as viewed in Figure 3, thus opening the valve. With this construction, the valve opens gradually as the temperature of the cooling fluid rises, and permits a gradual increase in the current of cooling liquid. As the engine and the cooling liquid lowers in temperature, the action of the thermostat and valve is exactly the reverse of that described and the butterfly valve is gradually moved toward closed position.

If the thermostat is under such a tension that it opens the valve too quickly or too slowly, the plug 50 may be removed and the threaded head 34 of the shaft 32 turned to place the thermostat under the desired tension. The plug 50 is then replaced.

I thus provide a thermostatically controlled valve which is simple and compact in construction and quick and positive in its action and one which may be quickly and readily assembled and quickly and readily adjusted to take up wear or looseness in the parts.

I claim:

1. In a cooling system, a valve casing having a passage extending therethrough, a valve member within said casing and movable to open or close said passage, a fixed element in said passage, and a helical thermostat connected to said fixed element and to said valve member.

2. In a cooling system, a valve casing having a passage extending therethrough, a valve member within said passage and movable to open or close said passage, a fixed element in said passage, a helical thermostat connected to said fixed element and to said valve member, and means for adjusting said fixed element to vary the tension of the helical thermostat.

3. In a cooling system, a valve casing having a passage therethrough, a valve member within said casing and movable to open or close said passage, a shaft extending within said passage, and a helical thermostat connected to and surrounding said shaft and connected to said valve member.

4. In a cooling system, a valve casing having a passage therethrough, a valve member within said casing and movable to open or close said passage, a shaft extending within said passage, a helical thermostat connected to and surrounding said shaft and connected to said valve member, and means for adjusting said shaft to vary the tension of the helical thermostat.

5. In a cooling system, a valve casing having a passage therethrough, a tubular valve-carrying shaft pivoted in said passage, a fixed element coaxial with said tubular shaft, and a thermostat connecting said fixed element and tubular shaft.

6. In a cooling system, a valve casing having a passage therethrough, a tubular valve-carrying shaft pivoted in said passage, a fixed element coaxial with said tubular shaft, a thermostat connecting said fixed element and tubular shaft, and means for adjusting said fixed element to vary the tension the thermostat.

7. In a cooling system, a valve casing having a passage therethrough, a tubular valve-carrying shaft pivoted in said passage, a fixed element coaxial with said tubular shaft, a thermostat connected to said fixed element and the inside of said tubular shaft, and openings in said tubular shaft on opposite sides of said valve.

8. In a cooling system, a valve casing having a passage therethrough, a tubular valve-carrying shaft pivoted in said passage, an inner shaft extending within said tubular shaft and a helical thermostat surrounding said inner shaft and connected to said inner shaft and tubular shaft.

9. In a cooling system, a valve casing having a passage therethrough, a tubular valve-carrying shaft pivoted in said passage, an inner shaft extending within said tubular shaft, a helical thermostat surrounding said inner shaft and connected to said inner shaft and tubular shaft, and means for adjusting said inner shaft to vary the tension on the helical thermostat.

10. In a cooling system, a valve casing having a passage therethrough, a tubular valve-carrying shaft pivoted in said passage, an inner shaft extending within said tubular shaft, a helical thermostat surrounding said inner shaft and connected to said inner shaft and tubular shaft, and openings in said tubular shaft on opposite sides of the valve.

11. In a cooling system, a valve casing having a passage therethrough, an aperture in said casing, an adjusting element in said aperture, a valve member within said passage, a thermostat interposed between said adjusting element and said valve member, and means for adjusting said adjusting element to vary the tension of the thermostat.

12. In a cooling system, a tubular valve casing having a passage longitudinally therethrough, a threaded aperture in the side of said casing, a threaded element fitting in said aperture and having a portion extended inwardly, a valve member within the casing and movable to open or close the passage, a thermostat connecting said valve member and the inwardly extending portion of the threaded head, and means for adjusting the threaded head to vary the tension on the thermostat.

13. In a cooling system, a valve casing having a passage therethrough, a tubular bearing member mounted in bearings in the casing, a valve-carrying sleeve mounted on said tubular bearing member, means for holding said elements against relative rotation, an aperture in the casing coaxial with the tubular bearing member, an element mounted in said aperture and extending inward, and a thermostat connecting said element and said valve.

14. In a cooling system, a valve casing having a passage therethrough, a tubular bearing member mounted in bearings in the casing, a valve-carrying sleeve mounted on said tubular bearing member, means for holding said elements against relative rotation, an aperture in the casing coaxial with the tubular bearing member, an element mounted in said aperture and extending inward, a thermostat connecting said element and valve, and means for adjusting said element to vary the tension of the thermostat.

15. In a cooling system for internal combustion engines, a conduit for liquid, a valve arranged to control the flow of liquid through said conduit, an adjustable abutment, and a bimetallic thermostat immersed in the liquid and interposed between said abutment and said valve.

16. In a cooling system for internal combustion engines, a conduit for cooling liquid, a valve for regulating the flow of said liquid therethrough, a thermostat associated with said valve to move the same toward open position as the temperature of said liquid rises, and means accessible from the exterior of said conduit for adjusting said thermostat while the conduit is maintained closed.

17. In a cooling system, a tubular valve casing having a passage longitudinally therethrough, a tubular valve-carrying shaft pivoted in said passage for opening or substantially closing said passage, an inner shaft extending within said tubular shaft, a helical thermostat surrounding said inner shaft and connected with said inner shaft and tubular shaft, and means for adjusting said inner shaft to vary the tension on the helical thermostat.

18. In a cooling system, a valve casing having a passage therethrough, a threaded aperture in said casing, a threaded element fitting in said aperture and having a portion extended inwardly, a valve member pivotally mounted within the casing and movable to open or substantially close said passage, a thermostat connecting said valve member and the inwardly extending portion of said threaded head, and means operated by adjustment of the threaded head for varying the tension on said thermostat.

19. In a cooling system for an internal combustion engine, a conduit for a cooling fluid, a valve pivotally mounted diametrically of said conduit for opening or substantially closing said conduit, a thermostat associated with said valve to move the same toward open position as the temperature of said liquid rises, and means accessible from the exterior of said conduit for adjusting said thermostat while said conduit remains closed.

In testimony whereof I affix my signature.

LOUIS M. SPENCER.